Oct. 20, 1936.  B. J. LOWRES  2,058,025
OPHTHALMIC MOUNTING
Filed Aug. 17, 1935
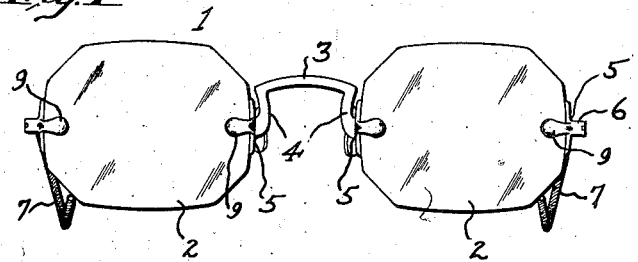
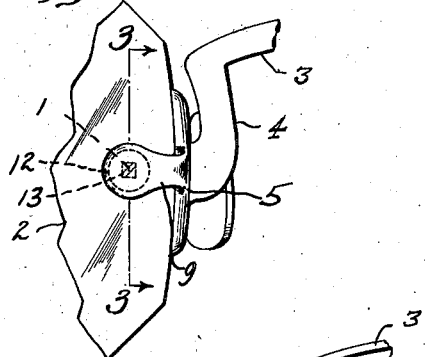
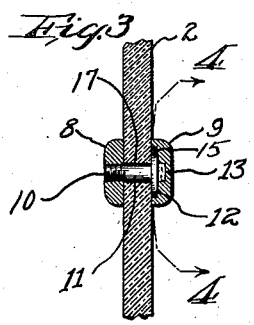
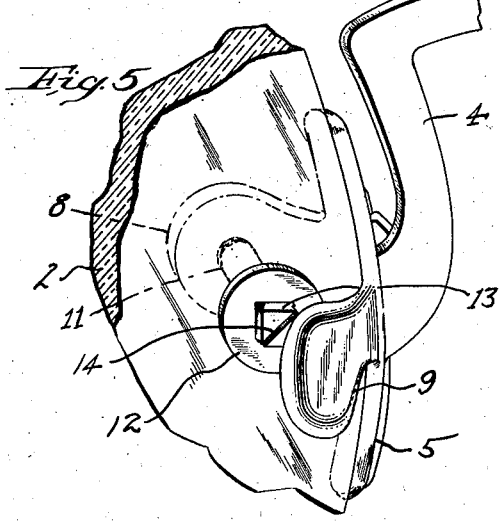
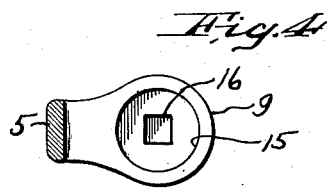
INVENTOR
Bert J. Lowres,
BY
George D. Richards
ATTORNEY Patented Oct. 20, 1936

2,058,025

UNITED STATES PATENT OFFICE 2,058,025

OPHTHALMIC MOUNTING

Bert J. Lowres, Newark, N. J.

Application August 17, 1935, Serial No. 36,639

2 Claims. (Cl. 88—47)

This invention relates, generally, to ophthalmic mountings, and the invention has reference more particularly to the provision of means for rigidly and permanently connecting the lenses of spectacles and eyeglasses to their supporting means.

Heretofore, in attaching the bridge to the lenses of rimless eyeglasses and also in attaching the temples to the lenses of spectacles, straps have been used that are provided with apertured arms which straddle opposite sides of the lenses, the said arms being adapted to have screws extend through the apertures thereof and through aligned apertures in the lenses. Usually the hole in one arm of each strap is threaded to engage the threads of the screw while the bight portion of each such strap engages against the edge of the lens. Considerable care must be exercised in tightening the screw used to hold the lenses to the strap mountings or else the lenses are apt to be broken, for owing to the stiffness of the arms of the straps, it is hard to tell just how tight a screw must be adjusted in order to prevent the lens from shifting about, and in order to stop such shifting of the lenses, opticians often insert the screw too tightly with the result that lenses are broken. Also these screws ofttimes tend to become loose due to handling of the eyeglasses and unscrew somewhat, thereby leading to looseness of the mountings upon the lenses.

The principal object of the present invention is to provide a novel ophthalmic mounting for spectacles and eyeglasses that is so constructed and arranged as to prevent looseness developing between the lens and its mounting, the said mounting having means for preventing the lens screw or fastener from unscrewing or becoming loose.

Another object of the present invention lies in the provision of a novel ophthalmic mounting of the above character wherein the head of the lens screw is adapted to engage one side of the lens directly for pressing the same against the opposing arm of the lens strap, thereby enabling the optician to readily determine the pressure with which the lens is held and hence preventing the breaking of lenses.

Other objects of this invention, not at this time more particularly enumerated, will be clearly understood from the following detailed description of the same.

The invention is clearly illustrated in the accompanying drawing, in which:

Fig. 1 is a view in front elevation of a pair of spectacles employing the novel ophthalmic mountings of this invention.

Fig. 2 is a large fragmentary view of a portion of the structure shown in Fig. 1.

Fig. 3 is a sectional view taken along the line 3—3 of Fig. 2.

Fig. 4 is an enlarged sectional view taken along the line 4—4 of Fig. 3, and

Fig. 5 is an enlarged fragmentary perspective view illustrating the manner of attaching the lens to its lens strap.

Similar characters of reference are employed in said views, to indicate corresponding parts.

Referring now to the said drawing, the reference numeral 1 designates a pair of spectacles having lenses 2 that are interconnected by the mounting or bridge member 3, as is usual. Bridge member 3 has depending arms or yokes 4 to the lower ends of which are integrally or otherwise connected lens straps 5 that are attached to the lenses 2. The outer edge portions of lenses 2 also have additional lens straps 5 attached thereto, which lens straps are secured to yokes 6 having temples 7 hingedly connected thereto.

As especially shown in Figs. 2 to 5, each of the lens straps 5 is provided with two arms 8 and 9 that are adapted to straddle opposite sides of a lens 2. The arm 8 is provided with a threaded aperture 10 for receiving a lens screw 11. Lens screw 11 is formed with a flat disk-like head 12 having an outwardly extending projection 13 thereon of non-circular shape. In the drawing, the projection 13 is shown as of square shape in plan, although this head may be of other irregular shape such as hexagonal. The projection 13 is provided with a slot 14 for receiving a screw driver. The diameter of the disk-like head 12 of screw 11 is relatively large in comparison to the diameter of the shank of the screw 11 in order that this head will have ample bearing surface upon the lens 2 in use, and hence will not break the latter when tightened.

The strap arm 9, (see especially Fig. 4) is provided with a receiving recess 15 of a shape and size to conformably receive the head of screw 11. Receiving recess 15 hence has a circular or disk-like main portion provided with a central depression 16 of square shape for conforming to the projection 13 of head 12.

In use, the lenses 2 are provided with lens apertures 17 for receiving the screws 11, and in assembling a lens with its strap the screw 11 is inserted through the lens aperture 17 and threaded into the aperture 10 of lens strap 8, as illustrated in Fig. 5. The strap arm 9 at this time is bent outwardly (as shown in Fig. 5) so as to enable access of a screw driver to the screw slot 14. If desired, the arm 9 may initially extend at right angles to the lens 2, thereby giving clear access to the head of the screw 12. The screw 11 is tightened so as to secure the lens to the arm 8 of the strap, and inasmuch as the entire pressure of this screw is applied directly upon the lens itself, the optician will know just how tight to make the screw without breaking the lens. After the screw has been thusly adjusted, the arm 9 is bent over so that receiving recess 15 receives the head 12 of screw 11 therein, the projection 13 having previously been so positioned angularly as to extend into the central depression 16 of this receiving recess 15. With the lens straps thus assembled upon the lens, (as shown in Figs. 1 to 3) the screw 11 is prevented from loosening, owing to the interlocking action of the square projection 13 with the receiving recess depression 16, both of these members being of non-circular shape, whereby screw 11 is positively held against turning. Lens strap arm 9 by surrounding the head of screw 11 also serves to steady this screw and provides a firm support therefor. Thus, the lens is held in its initial tight position indefinitely by the screw 11 which cannot become loose since it is held positively from turning.

Inasmuch as the arms 9 of the lens straps are the forward or exposed arms of the same (as shown in Fig. 1) and as these arms have no apertures or screw heads thereon, the same present an extremely neat and attractive appearance, thereby greatly enhancing the saleability of eyeglasses employing the novel mountings of the present invention.

As many changes could be made in the above construction and many apparently widely different embodiments of this invention could be made without departing from the scope thereof, as defined by the following claims, it is intended that all matter contained in the above description or shown in the accompanying drawing shall be interpreted as illustrative and not in a limiting sense.

I claim:—

1. An ophthalmic mounting for spectacles and eyeglasses comprising a lens strap having similar integral arms for engaging opposite sides of a lens, one of said arms having a threaded aperture extending therethrough, the other of said arms having a non-circular receiving recess on its inner surface, its outer surface being unbroken, a fastener screw for extending through the lens and threaded into the aperture of said first named arm, said screw having a non-circular head portion for extending conformably into the receiving recess of the other of said arms to be held against turning therein.

2. An ophthalmic mounting for spectacles and eyeglasses comprising a lens strap having similar integral arms for engaging opposite sides of a lens, one of said arms having a threaded aperture extending therethrough, the other of said arms having a non-circular receiving recess on its inner surface, its outer surface being unbroken, a fastener screw for extending through the lens and threaded into the aperture of said first named arm, said screw having a disk shaped head provided with a projecting non-circular head portion for conformably extending into the receiving recess of the other of said arms to be held against turning therein.

BERT J. LOWRES.